United States Patent [19]

Rittersdorf et al.

[11] 3,850,576

[45] Nov. 26, 1974

[54] DIAGNOSTIC COMPOSITION FOR THE DETECTION OF UROBILINOGEN

[75] Inventors: Walter Rittersdorf, Mannheim-Waldhof; Dieter Berger, Viernheim; Hans-Georg Rey; Peter Rieckmann, both of Mannheim-Waldhof, all of Germany

[73] Assignee: Boehringer Mannheim GmbH, Mannheim, Germany

[22] Filed: Dec. 11, 1972

[21] Appl. No.: 314,067

[30] Foreign Application Priority Data
June 19, 1972 Germany............................ 2229611

[52] U.S. Cl. ............ 23/230 B, 23/253 TP, 252/408
[51] Int. Cl. ......................................... G01n 33/16
[58] Field of Search..... 23/230 B, 253 TP; 252/408; 260/141

[56] References Cited
UNITED STATES PATENTS

| 2,854,317 | 9/1958 | Free et al. | 23/230 B |
| 3,511,607 | 5/1970 | Green | 23/230 B |
| 3,585,001 | 6/1971 | Mast | 23/230 B |
| 3,585,004 | 6/1971 | Mast | 23/253 TP |
| 3,652,222 | 3/1972 | Denney et al. | 23/230 B |

OTHER PUBLICATIONS

Wheland, Advanced Organic Chemistry, 3rd ed., Wiley & Sons, N.Y. (1960), pp. 532–535.
Clark et al., Quarterly Reviews, V. XVIII, pp. 295–304 (1964).

Primary Examiner—Joseph Scovronek
Assistant Examiner—Timothy W. Hagan
Attorney, Agent, or Firm—Ralph D. Dinklage

[57] ABSTRACT

Urobilinogens, optionally in the presence of bilirubin, are detected with a novel diagnostic agent comprising a. at least one stable diazonium salt containing a phenyl-, pyrrole, or pyrazole ring annellated with an aromatic system in a mesomerizable and sterically unhindered position or substituted directly or via a vinylene radical with an aromatic system, or b. a pyridine or pyrazole diazonium salt substituted in a mesomerizable position with at least one polyatomic electron donor group having at least one mesomerizable electron pair with the proviso that the sum of the Hammett sigma values for all the substituents, and hetero atoms does not exceed the value of +0.6.

25 Claims, No Drawings

DIAGNOSTIC COMPOSITION FOR THE DETECTION OF UROBILINOGEN

The present invention is concerned with improved diagnostic agents and methods. More specifically, the invention relates to the detection of urobilinogen bodies in body fluids, especially in urine.

It is known that urobilinogen bodies (bilans), indole, sulfonamides, porphobilinogens, urine indican and 5-hydroxy-indole-acetic acid can be detected with a solution of p-dimethylamino-benzaldehyde in hydrochloric acid. This detection reaction is known in the literature as Ehrlich's reaction. It has achieved considerable importance, especially in medical diagnosis, for the detection of "increased urobilinogens" in urine. Although the test is not very specific, it is considered to be the standard method for the diagnosis of diseases of the liver and gall bladder.

Since, in clinical-chemical diagnosis, test papers are of ever increasing importance, test papers have also been developed for the detection of urobilinogen based on Ehrlich's reaction. However, these test papers suffer from two important disadvantages:

1. the color reaction develops so slowly that it is necessary to wait for at least one minute before reading off the results;
2. the test papers inherently possess the non-specificity of Ehrlich's test so that falsely positive results cannot be excluded.

For a long time, there has admittedly been evidence that urobilinogen couples with diazotized sulphanilic acid to give a yellow colored material. This reaction was discovered by Ehrlich in 1884 and is referred to as the so-called "yellow diazo reaction." The reaction was subsequently investigated several times but hitherto it has not been possible to ascertain whether it is definitely a diazo coupling reaction with the urobilinogen or whether other materials may also be responsible for the formation of the yellow colored material (cf. T. K. With, Biologie der Gallenfarbstoffe, pub. Georg.-Thieme-Verlag, Stuttgart, 1960, pp. 32 and 211). Since this is more of a curiosity than a useful agent for clinical-chemical diagnosis, the yellow diazo reaction is of no practical importance and is scarcely mentioned in the relevant textbooks.

We have now found that stable phenyl-, pyrrole- and pyrazole-diazonium salts which are annellated (i.e., ring-fused) with an unsubstituted or substituted iso- or heterocyclic aromatic system in a mesomerizable and sterically unhindered position or are substituted directly or via a vinylene radical with an unsubstituted or substituted iso- or heterocyclic aromatic system, as well as pyridine- and pyrazole-diazonium salts which contain, in a mesomerizable position, at least one polyatomic electron donor group with at least one mesomerizable electron pair, the sum of the Hammett sigma values of all substituents and heteroatoms not exceeding the value of +0.6, are outstandingly useful for the detection of urobilinogen.

Thus, the present invention provides a diagnostic agent for the detection of urobilinogen, possibly together with bilirubin, in body fluids, which comprises at least one stable phenyl-, pyrrole- or pyrazole-diazonium salt which is annellated with an unsubstituted or substituted iso- or heterocyclic aromatic system in a mesomerizable and sterically unhindered position or is substituted directly or via a vinylene radical with an unsubstituted or substituted iso- or heterocyclic aromatic system and/or at least one pyridine- or pyrazolediazonium salt which contains, in mesomerizable position, at least one polyatomic electron donor group with at least one mesomerizable electron pair, the sum of the Hammett sigma values of all substituents and heteroatoms not exceeding the value of +0.6, together with at least one inorganic or organic acid.

As examples of aromatic systems, there may be mentioned benzene and its homologues and heterocyclic compounds, preferably with a $\pi$-electron excess. Furthermore, electron donor groups favor the reaction of the diagnostic agents according to the present invention but, for example, in hetero-aromatics with a large $\pi$-excess are unnecessary. Typical $\pi$-excess heteroaromatics include, for example, five-membered rings with at least one cyclic nitrogen atom, such as pyrrole, pyrazole, imidazole, oxazole, isoxazole and thiazole. Thiophene and furan can also be used. In some cases, there can also be used $\pi$-deficient heterocycles, such as pyridine, especially when the electron deficiency is overcompensated by electron donor groups.

The most important electron donor groups are groups which contain oxygen, sulfur or nitrogen directly bonded to the aromatic system. Oxygen-containing groups include, for example, hydroxyl, alkoxy and aryloxy groups. As sulfur-containing groups, there can usually only be used alkylthio or arylthio radicals because the free mercapto group cannot, as a rule, be used due to its sensitivity to oxidation. As nitrogen-containing groups, there can be used alkylamino, acylamino, arylamino or aryl-alkylamino radicals. In the selection of the substituents, care must be taken that they do not react with the diazo group. This applies particularly to o-alkylamino, o-acylamino and o-arylamino radicals.

For the further explanation of the present invention, in the following are described four groups of compounds which are especially well suited for the present invention:

I. Pyridine-diazonium salts of the general formula:

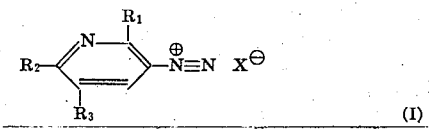

(I)

wherein $R_1$ and $R_2$, which may be the same or different, are electron donor groups and $R_3$ is a hydrogen atom or a radical which does not increase the sum of the Hammett sigma values in the pyridine ring to above +0.6, whereby one of the symbols $R_1$ and $R_2$ can also be a hydrogen atom or a lower alkyl radical (e.g., of up to 8 carbon atoms), and X is a stabilizing anion. Those compounds are preferred in which the symbol $R_1$ is a hydrogen atom or a lower alkoxy radical, $R_2$ is a lower alkoxy, alkylamino (i.e., wherein the alkyl moiety is of up to 8 carbon atoms), arylamino (e.g., phenyl or naphthylamino) or hydroxyl and $R_3$ is hydrogen or lower alkyl (1 to 8 carbon atoms) or an electron donor group.

II. Diazonium salts of the general formula:

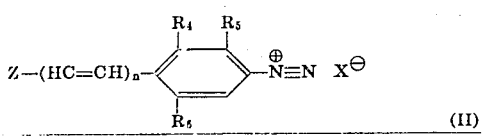

(II)

wherein Z is an unsubstituted or substituted phenyl ring, n is 0 or 1, X is a stabilizing anion and $R_4$, $R_5$ and $R_6$, which may be the same or different, are hydrogen atoms or radicals which do not increase the sum of the Hammett sigma values to above +0.6, whereby $R_4$ can also represent a methylene radical connected to the phenyl ring Z.

III. Diazonium salts of the general formula:

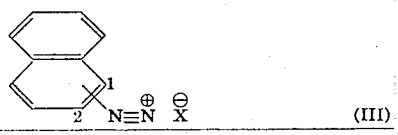

(III)

wherein X is a stabilizing anion and wherein the naphthalene ring system can be substituted one or more times when the sum of the Hammett sigma values of all substituents does not exceed the value of +0.6, whereby the 1- and 2-positions ortho to the diazonium group must not be substituted. As examples of optional substituents in the naphthalene ring there may be mentioned, by way of example, lower alkyl, lower alkoxy, carboxyl, sulfo and hydroxyl groups, as well as halogen atoms.

IV. Diazonium salts of pyrrole or pyrazole derivatives which are substituted by or annellated with phenyl radicals, whereby only sterically unhindered positions of the hetero-aromatic system can carry the diazonium group, which are capable of mesomeric exchange action with a cyclic nitrogen atom and whereby the hetero-aromatic system can also be substituted by lower alkyl, hydroxyl or lower alkoxy groups or by halogen atoms.

By lower alkyl, alkoxy, acyl and alkylamino radicals we mean generally those with up to 8 carbon atoms and preferably up to 3 carbon atoms. As aralkyl and aryl radicals, the benzyl, phenyl and naphthyl radicals are preferred.

The diazonium salts used according to the present invention react virtually instantaneously with urobilinogen and give very specific red to blue colored materials which are especially well suited for the detection of urobilinogen, even in very low concentrations. Furthermore, the compounds used according to the present invention possess the great advantage that the color reaction is not disturbed by urea. The previously known test papers are colored yellow to an extent depending upon the concentration of urea in the urine, which can make the detection of small amounts of urobilinogen very difficult. Furthermore, the color reaction according to the present invention is not influenced by those substances which frequently occur in the urine and which, as is known, usually have a disturbing effect on the Ehrlich reaction; these substances include, in particular, the aromatic amines which, as medicaments (sulfonamides, sulfonyl-ureas and the like) are frequently excreted in the urine. Hitherto, the presence of these aromatic amines in the urine gave rise to yellow or orange color reactions which not only mask but also simulate the color brought about by the urobilinogen.

For the detection of bilirubin, which is also important for the diagnosis of diseases of the liver and gall bladder, diazonium salts, for example diazolsulfanilic acid, p-nitrobenzene diazonium salts and 2,4-dichlorobenzenediazonium salts, have admittedly already been used for a comparatively long time. However, as is to be expected, these do not give a useful color reaction with urobilinogen.

In contradistinction thereto, the compounds used according to the present invention permit the specific detection of urobilinogen in the presence of bilirubin. In some cases, bilirubin admittedly also reacts with the compounds used according to the present invention but the reaction usually only takes place after the color reaction with urobilinogen has substantially developed and differs in color so considerably that it is, surprisingly, even possible to determine both gall coloring substances with a single reagent and to estimate the ratio of the amounts thereof on the basis of the mixed color which develops. Thus, a red color can indicate the presence of urobilinogen and subsequently developing blue color the presence of bilirubin. When both gall coloring substances are present simultaneously, the test first becomes red and, subsequently, increasingly violet. In exceptional cases, the color reactions develop simultaneously but this does not influence the result of the test.

If the reaction with bilirubin is to be suppressed, this can be achieved by using, as indicator, a diazonium salt with a relatively low electrophilic character and allowing the reaction to take place in the presence of a cationic wetting agent.

In this way, it is possible so to modify the agent for the detection of urobilinogen, possibly together with bilirubin, that they can be made optimal for the desired purpose.

The compounds used according to the present invention, especially the compounds defined above under I to IV, are preferably employed for the production of test papers. For this purpose, the substances are applied to an absorbent carrier, together with a solid acid and, if desired, with additives, for example, stabilizers and wetting agents. Furthermore, the said compounds can also be used for the production of test film strips according to German Pat. application No. 1,598,153 and for the detection of urobilinogen in solutions.

For the production of a preferred embodiment of the new diagnostic agent according to the present invention, an absorbent carrier, preferably filter paper, is impregnated with a solution which contains, per 100 ml., 0.05 – 5 g., preferably 0.1 – 1g., of a diazonium salt to be used according to the present invention, as well as 2 – 30 g., preferably 5 – 20 g., of a solid inorganic or organic acid and possibly at least one wetting agent and/or stabilizer.

As solvents for the impregnation solutions, it is particularly preferred to use water or readily volatile organic solvents which do not react with the diazonium salts, the preferred organic solvents being lower alcohols, ethyl acetate and acetonitrile.

For the production of the diazonium salt solution, the previously prepared diazonium salt can be added to the solution or the salt can be produced in the solution by diazotisation, in known manner, of an appropriate aromatic amine.

Furthermore, as is known, the diazonium group can also be introduced directly into certain aromatic compounds, especially into phenols and five-membered heterocyclic compounds. This takes place by reaction of the compounds in question with an excess of nitrite in the impregnation solution, the reaction taking place via the nitroso compound.

For reasons of storage stability, there are normally only used stable diazonium salts, i.e., salts which possess a stabilizing anion; these include, in particular, the sulfate, tetrafluoborate, tetrachlorozincate, hexachloroantimonate and aryl-sulfonate ions.

As solid inorganic or organic acids, there can be used, for example, orthophosphoric acid, metaphosphoric acid, sulfosalicylcic acid or oxalic acid, or acidic salts, for example, potassium bisulfate, as well as adducts of Lewis acids and Lewis bases provided that they have a suitable acidic reaction. Commercially available metaphosphoric acid, which contains about 50 – 60 percent of its sodium salt, has proved to be especially useful since, as we have found from experience, this gives especially stable test papers. Furthermore, metaphosphoric acid and oxalic acid have the advantage that they give test reagents which only react slowly with bilirubin. Generally, it is preferred to use an acid which has a $P_k$ value of less than 3.0.

The stabilizing additives which are preferably used are well known in diazo chemistry; such additives include, for example, sodium fluoborate, sodium aryl-sulfonates, magnesium sulfate and sodium metaphosphate.

The use of wetting agents is desirable not only because of the improved wetting which they bring about but also because they bring about additional specific actions. Thus, anionic wetting agents, especially sulfates and sulfonates, bring about an increased sensitivity and a slight bathochromic color shift in the detection of urobilinogen. As examples of anionic wetting agents which can be used there may be included sodium lauryl sulfate and sodium p-dodecyl-benzene-sulfonate.

In some cases, it is desired only to detect a significantly increased urobilinogen level. In such cases, it is possible to reduce the sensitivity and reaction velocity by the addition of cationic wetting agents, for example, lauryl pyridinium chloride.

Non-ionic wetting agents, for example polyoxyethylene triglyceride, generally only influence the wettability of the test papers.

The wetting agents can be added in amounts of about 0.1 – 3g., preferably of 0.3 – 1g., per 100 ml. of impregnation solution.

The individual components of the formulations can also be applied successively when the solubilities thereof require this or when special effects are to be achieved. Thus, for example, for reasons of stability, the diazonium salt and the stabilizer can be applied first, followed by a further impregnation with the acid.

After the absorbent carrier has been impregnated, it is dried at the lowest possible temperature in order not to damage the diazonium salts.

As absorbent carrier, filter paper is especially preferred but fleeces and felts of acid-resistant synthetic resins, for example, of polypropylene and polyesters, can also be used.

The absorbent carriers provided with the reagents are preferably cut up into small squares and sealed on to synthetic resin films or sealed between two synthetic resin films or between a synthetic resin film and a fine-meshed material. Although test papers represent a preferred embodiment of the present invention and are the most elegant diagnostic agent for the detection of the components present in body fluids, it is, of course, also possible to use the diazonium salts according to the present invention for the detection of urobilinogen in the liquid phase, in which case the acid used can be one which is gaseous, liquid or solid but which is soluble in or miscible with the liquid phase used. When the diazonium salts in acidic solution are added dropwise to a urobilinogen-containing urine, then there are obtained blue colorations or precipitates which can, if desired, be extracted with an organic solvent, for example with chloroform.

For carrying out the process according to the present invention for the detection of urobilinogen in body fluids, the new diagnostic agents are dipped into the solution to be investigated and the color change then read off after a short period of time.

The diazonium salts and the corresponding amines and heterocyclic compounds used according to the present invention are generally known.

As is known, the Hammett sigma values are measurement values for the electron-attracting or electron-repelling effect of substituents (in the first case, the sigma values are positive and, in the latter case, are negative). The sigma values are additive, the sign in front of the sum indicating, in comparison with hydrogen, whether the electron-attracting or electron-repelling effect preponderates. The limiting value according to the present invention thus indicates that the action of the electron-donating substituents may only be reduced by the electron-attracting substituents to the sigma value of +0.6. There can, for example, be used a benzenediazonium salt with a hydroxyl group in the p-position (sigma value −0.37), together with one or more electron-attracting groups with a total sigma value of up to +0.97, whereas a diazonium salt which is substituted with an o-methoxy or p-acetamino radical (sigma value in both cases + 0) can only contain electron attracting groups up to a total sigma value of +0.6. Of course, hetero atoms also have sigma values which should be taken into account in the calculation.

Although Hammett calculations are today carried out routinely and represent a valuable basis for theoretical hypotheses in the chemistry of aromatic compounds, these values should not be regarded as being generally valid, absolute values. On the contrary, they are approximate values which involve certain degrees of uncertainty due to their empirical determination. However, these uncertainties are only of significance in rare borderline cases which in no way impair the general teachings of the present invention.

The following Examples are given for the purpose of illustrating the present invention:

EXAMPLE 1

Filter paper (Schleicher & Schull No. 23 SL) was impregnated with a solution of the following composition and dried at 40°C.:

2,6-dimethoxy-pyridine-3-diazonium

-Continued

| | |
|---|---|
| fluoborate | 0.3 g. |
| metaphosphoric acid | 10.0 g. |
| sodium lauryl sulfate | 0.4 g. |
| methanol | 5.0 ml. |
| water | ad 100 ml. |

Upon dipping into urine, the test paper gave, after about 5 – 10 seconds, the following color reactions:

| | |
|---|---|
| urobilinogen-free urine | no color change |
| urine with normal urobilinogen content | pink |
| urine with increased urobilinogen content | lilac-red |

Similar color reactions were given by test papers which contain 0.3 g. of one of the following diazonium salts:

| | |
|---|---|
| biphenyl-4-diazonium fluoborate: | red |
| naphthalene-1-diazonium fluoborate: | red |
| 4-chloronaphthalene-1-diazonium fluoborate: | red |
| 1-phenyl-2,3-dimethyl-pyrazole-5-one-4-diazonium fluoborate: | pink-red |

EXAMPLE 2

Filter paper (Schleicher & Schull No. 23 SL) was first impregnated with a solution which had been prepared as described in the following and dried at 40°C., whereafter the paper obtained was again impregnated with a 0.4 percent solution of sodium dodecyl-benzenesulfonate in methylene chloride.

1 mMol 2-amino-7-methoxy-fluorene was dissolved in 70 ml. of 15 percent aqueous solution of metaphosphoric acid. Subsequently, while cooling (5°– 20°C.) 10 ml of a 0.1 molar sodium nitrite solution is added thereto. After about 1 hour, the solution was filtered, the filtrate was made up to 100 ml. with metaphosphoric acid solution and the solution thus obtained was used directly for the impregnation.

The test paper obtained gave, upon dipping into urine, a violet color reaction after about 5 to 10 seconds.

In an analogous manner, there were used the amines set out in the following Table, whereby, in the case of the reaction of aminonaphthols and of their sulfonic acids, an addition of 0.5 g. zinc sulfate is necessary for the suppression of oxidation:

| | |
|---|---|
| 4-amino-2,5'-dimethoxy-stilbene | violet |
| 2-amino-7-nitrofluorene | red |
| 1-amino-4-nitronaphthalene | red |
| 1-amino-4-hydroxy-naphthalene | red-violet |
| 1-amino-5-hydroxy-naphthalene | red-violet |
| 1-amino-7-hydroxy-naphthalene | red-violet |
| 1-amino-4-sulfo-naphthalene | red |
| 1-amino-4-methoxy-naphthalene | red-violet |
| 1-amino-5-sulfo-naphthalene | red |
| 1-amino-6-sulfo-naphthalene | red |
| 1-amino-7-sulfo-naphthalene | red |
| 1-amino-3,6-disulfo-naphthalene | orange-red |
| 1-amino-3,8-disulfo-naphthalene | orange-red |
| 1-amino-5-hydroxy-7-sulfo-naphthalene | red-violet |

-Continued

| | |
|---|---|
| 1-amino-8-hydroxy-3,6-disulfo-naphthalene | red |
| 2-amino-naphthalene | brick-red |
| 2-amino-7-hydroxy-naphthalene | red-violet |
| 2-amino-5-sulfo-naphthalene | brick-red |
| 2-amino-6-sulfo-naphthalene | brick-red |
| 2-amino-7-sulfo-naphthalene | brick-red |
| 2-amino-6,8-disulfo-naphthalene | orange-red |
| 2-amino-8-hydroxy-6-sulfo-naphthalene | red |
| 2-amino-3-carboxy-naphthalene | red |
| 1-amino-anthracene | violet |
| 2-amino-anthracene | violet |
| 1-amino-pyrene | blue |
| 1-amino-5-nitro-naphthalene | red |
| 2-amino-6-nitro-8-sulfo-naphthalene | orange-red |
| 4-(6-methyl-benzthiazolyl-2)-aniline | red |
| 4-(3-methyl-pyrazol-5-onyl-1)-aniline | red |
| 4-(3-methyl-4-nitroso-pyrazol-5-onyl-1)-aniline | red |
| 5-amino-indole | violet |
| 3-amino-carbazole | violet |
| 5-amino-indazole | red |
| 6-amino-indazole | salmon pink |
| 7-amino-indazole | red |
| 5-amino-2-mercapto-benzimidazole | red |
| 5-amino-2-hydroxy-benzimidazole | red-violet |
| 6-amino-2-mercapto-benzthiazole | red |
| 5-amino-quinoline | brick red |
| 3-amino-9-ethyl-carbazole | violet |
| 8-amino-quinoline | brick red |
| 8-amino-6-methoxy-quinoline | brick red |
| 3,4-diamino-5-hydroxy-pyrazole | red |
| 3-amino-2,6-dimethoxy-pyridine | lilac red |
| 3-amino-6-hydroxy-pyridine | brick red |
| 3-amino-6-dimethylamino-pyridine | red |
| 3-amino-6-morpholino-pyridine | red |
| 3-amino-6-(4-methoxy-phenyl)-pyridine | red |
| 3-amino-inadazole | red |
| 1-amino-4-cyano-naphthalene | red |
| 2-amino-chrysene | violet |
| 5-amino-2-methyl-benzthiazole | red |

EXAMPLE 3

Filter paper (Schleicher & Schull No. 23 SL) was impregnated with a 2.5 percent aqueous solution of sodium metaphosphate and dried at 80°C. Thereafter, it was again impregnated with a solution of the following composition and dried at 40°C. until the odor of isoamyl nitrite had disappeared:

| | |
|---|---|
| 1-amino-4-methoxy-naphthalene | 0.3 g. |
| oxalic acid | 10.0 g. |
| isoamyl nitrate | 1.0 ml. |
| methanol | ad 100.0 ml. |

Upon dipping into urobilinogen-containing urine, the test paper became violet colored.

Test papers produced in an analogous manner with the use of 1-amino-5-acetamino-naphthalene reacted to give a red color.

EXAMPLE 4

Filter paper (Schleicher & Schull No. 23 SL) was impregnated with a solution of 8-hydroxyquinoline-5-diazonium metaphosphate, which has been produced in the manner described hereinafter, and then dried at 40°C.

In about 70 ml. of a 15 percent aqueous metaphosphoric acid solution were dissolved 0.5 g. 8-hydroxyquinoline and the solution cooled to about 5°C. Thereafter, 2.5 g. solid sodium nitrite were added, with stirring, and the reaction mixture left to stand overnight in a refrigerator. Thereafter, insoluble material was filtered off and the filtrate made up to 100 ml. with metaphosphoric acid.

Upon dipping into urobilinogen-containing urine, the test paper became red colored.

In an analogous manner, by the direct introduction of the diazo group, test papers were produced containing the following diazonium salts:

| | |
|---|---|
| 5-hydroxy-isoquinoline-8-diazonium metaphosphate | red |
| 3-methyl-5-ethoxy-pyrazole-4-diazonium metaphosphate | brick red |
| 1-phenyl-pyrrole-3-diazonium metaphosphate | red |
| 1-phenyl-3-methyl-pyrazole-4-diazonium metaphosphate | red |
| N-2-trimethylene-1,8-naphthalimide-4-diazonium metaphosphate | violet |

It will be understood that the specification and examples are illustrative but not limitative of the present invention and that other embodiments within the spirit and scope of the invention will suggest themselves to those skilled in the art.

What is claimed is:

1. Diagnostic composition for the detection of urobilinogens, which diagnostic composition comprises at least one organic or inorganic acid and at least one diazonium salt selected from the group consisting of:
   a. stable phenyl-diazonium, pyrrole-diazonium and pyrazole-diazonium salts annellated with an isocyclic or heterocyclic aromatic system in a mesomerizable and sterically unhindered position of the phenyl, pyrrole or pyrazole ring;
   b. stable phenyl-diazonium, pyrrole-diazonium and pyrazole-diazonium salts wherein the phenyl, pyrrole or pyrazole ring is substituted with an iso-cyclic or heterocyclic aromatic system in a mesomerizable and sterically unhindered position of the phenyl, pyrrole and pyrazole ring;
   c. stable phenyl-diazonium, pyrrole-diazonium and pyrazole-diazonium salts wherein the phenyl, pyrrole or pyrazole ring is substituted via a vinylene linkage with an iso-cyclic or heterocyclic aromatic system in a mesomerizable and sterically unhindered position of the phenyl, pyrrole or pyrazole ring;
   d. a pyridine-diazonium or pyrazole-diazonium salt containing, in a mesomerizable position of the pyridine or pyrazole ring, at least one polyatomic electron donor group substituent with at least one mesomerizable electron pair and wherein the ring may contain additional substituents,
with the proviso that the sum of the Hammet sigma values of all the substituents, and of the ring hetero atoms in said diazonium salts does not exceed the value of +0.6.

2. Diagnostic composition as claimed in claim 1 in which said diazonium salt is a salt of an inorganic acid.

3. Diagnostic composition as claimed in claim 1 in which said diazonium salt is a salt of an organic acid.

4. Composition as claimed in claim 1 wherein said diazonium salt is a pyridine diazonium salt of the formula:

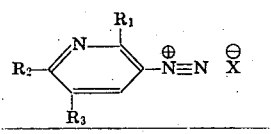

wherein $R_1$ and $R_2$, which may be the same or different are electron donor groups and $R_3$ is a hydrogen atom or a radical which does not increase the sum of the Hammett sigma values in the pyridine ring to above +0.6, whereby one of the symbols $R_1$ and $R_2$ can also be a hydrogen atom or a lower alkyl radical, and X is a stabilizing anion.

5. Diagnostic composition as claimed in claim 1 wherein the diazonium salt used has the formula:

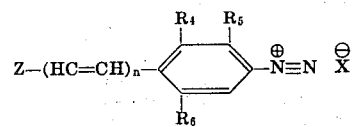

in which Z is an unsubstituted or substituted phenyl ring. $n$ is 0 or 1, X is a stabilizing anion and $R_4$, $R_5$ and $R_6$, which may be the same or different, are hydrogen atoms or radicals which do not increase the sum of the Hammett sigma values of the substituents on the phenyl ring above +0.6, whereby $R_4$ can also represent a methylene radical connected to the phenyl ring Z.

6. Diagnostic composition as claimed in claim 1 wherein the diazonium salt used has the formula:

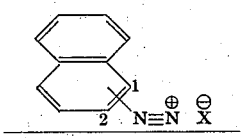

wherein X is a stabilizing anion and wherein the naphthalene ring system may be substituted with at least one substituent, at other than the position ortho to the diazonium function, provided the sum of the Hammett sigma values of all the substituents does not exceed +0.6.

7. Composition as claimed in claim 1 wherein said diazonium salt is a pyrrole- or pyrazole-diazonium salt selected from sub-group (a) or (b) and said aromatic system is a phenyl ring, resulting in a heteroaromatic system in which only sterically unhindered positions of the hetero-aromatic system can carry the diazonium group and said group is capable of mesomeric exchange action with a cyclic nitrogen atom.

8. Composition as claimed in claim 7 wherein the heteroaromatic system may be substituted by lower alkyl or alkoxy of from 1 to 8 carbon atoms, hydroxyl or halogen.

9. Composition as claimed in claim 4 wherein $R_1$ is a hydrogen atom or a lower alkoxy radical, $R_2$ is a lower alkoxy, alkylamino, arylamino or hydroxyl-group and $R_3$ is hydrogen or lower alkyl or an electron donor group.

10. Composition as claimed in claim 6 wherein the substituent in the naphthalene ring is at least one of the group consisting of lower alkyl of from 1 to 8 carbon atoms, lower alkoxy of from 1 to 8 carbon atoms, carboxyl, sulfo, halogen and hydroxy.

11. Composition as claimed in claim 2 wherein said salt is a chloride, sulfate, tetrafluoborate, tetrachlorozincate, hexachloroantimonate, nitrate or phosphate.

12. Composition as claimed in claim 3 wherein said salt is a carboxylate of up to 8 carbon atoms in the carboxy moiety or an arylsulfonate of up to 10 carbon atoms in the aryl moiety.

13. A test device comprising a diagnostic composition as claimed in claim 1 wherein said diazonium salt is impregnated in an absorbent carrier with a solution of a solid acid or acid salt.

14. Composition as claimed in claim 13 wherein said solid acid or acid salt is orthophosphoric acid metaphosphoric acid, sulphosalicylic acid, oxalic acid potassium bisulphate or an acidic adduct of a Lewis acid and a Lewis base.

15. Composition as claimed in claim 13 additionally comprising a wetting agent impregnated into the absorbent carrier.

16. Composition as claimed in claim 13 wherein said absorbent carrier is one of (a) filter paper (b) a fleece of acid resistant synthetic resin, and (c) a felt of acid resistant synthetic resin.

17. Composition as claimed in claim 13 wherein said impregnated absorbent carrier is sealed onto a synthetic resin film protruding therefrom.

18. Composition as claimed in claim 13 wherein said impregnated absorbent carrier is sealed between a synthetic resin film and (a) a fine mesh material or (b) another synthetic resin film.

19. Composition as claimed in claim 1 wherein said diazonium salt is a 2,4-dimethoxy-pyridine-3-diazonium salt.

20. Composition as claimed in claim 1 wherein said diazonium salt is a 1-phenyl-2,3-dimethyl-pyrazol-5-on-4-diazonium salt.

21. Method of detecting a urobilinogen which method comprises contacting the sample suspected of containing urobilinogen with a diagnostic composition as claimed in claim 1.

22. Method as claimed in claim 21 wherein said sample contains bilirubin.

23. Composition as claimed in claim 1 wherein said organic or inorganic acid is metaphosphoric acid.

24. Composition as claimed in claim 1 wherein said organic or inorganic acid is oxalic acid.

25. Composition as claimed in claim 1 wherein said organic or inorganic acid has a $P_k$ value of less than 3.0

* * * * *